US011959870B2

United States Patent
Salzer et al.

(10) Patent No.: US 11,959,870 B2
(45) Date of Patent: Apr. 16, 2024

(54) DIFFERENTIAL PROBE WITH LOW-SLOPE COMPONENT

(71) Applicant: Hach Company, Loveland, CO (US)

(72) Inventors: Corey Alan Salzer, Fort Collins, CO (US); Russell Young, Fort Collins, CO (US)

(73) Assignee: HACH COMPANY, Loveland, CO (US)

( * ) Notice: Subject to any disclaimer, the term of this patent is extended or adjusted under 35 U.S.C. 154(b) by 124 days.

(21) Appl. No.: 17/569,076

(22) Filed: Jan. 5, 2022

(65) Prior Publication Data

US 2023/0213469 A1 Jul. 6, 2023

(51) Int. Cl.
*G01N 27/333* (2006.01)
*G01N 27/30* (2006.01)
*G01N 27/403* (2006.01)

(52) U.S. Cl.
CPC ......... *G01N 27/302* (2013.01); *G01N 27/301* (2013.01); *G01N 27/333* (2013.01); *G01N 27/4035* (2013.01)

(58) Field of Classification Search
CPC .. G01N 27/302; G01N 27/301; G01N 27/333; G01N 27/4035; G01N 27/4165
See application file for complete search history.

(56) References Cited

U.S. PATENT DOCUMENTS

| 4,269,682 | A | * | 5/1981 | Yano | ................. H01L 21/02675 257/411 |
| 4,645,583 | A | * | 2/1987 | Shirai | ................. G01N 27/301 257/253 |
| 4,650,562 | A | | 3/1987 | Harman, III et al. | |
| 4,818,361 | A | * | 4/1989 | Burgess | ............. G01N 33/4915 204/411 |
| 4,913,793 | A | * | 4/1990 | Leonard | ................ G01N 27/301 204/435 |
| 5,066,383 | A | * | 11/1991 | Yamaguchi | .......... G01N 27/301 204/435 |
| 7,176,692 | B2 | * | 2/2007 | Adami | ................ G01N 27/4035 324/693 |
| 8,608,925 | B2 | | 12/2013 | King et al. | |

(Continued)

FOREIGN PATENT DOCUMENTS

CN 113588753 A 11/2021

*Primary Examiner* — Alexander S Noguerola
(74) *Attorney, Agent, or Firm* — Ference & Associates LLC

(57) ABSTRACT

An embodiment provides a method for measuring an analyte of a sample, including: introducing a sample to a sample region of a measurement device; the measurement device comprising: a measurement electrode and a ground electrode contacting the sample; a low-slope reference electrode in a reference electrode assembly having an electrolyte solution, wherein the electrolyte solution is in contact with the low-slope reference electrode; wherein the electrolyte solution is electrically coupled to the sample via at least one junction; and measuring a first potential between the measurement electrode and the ground electrode; measuring a second potential between the low-slope reference electrode and the ground electrode; determining an analyte in the sample by comparing the first potential and the second potential. Other aspects are described and claimed.

20 Claims, 4 Drawing Sheets

(56) References Cited

U.S. PATENT DOCUMENTS

| | | |
|---|---|---|
| 8,900,433 B2 | 12/2014 | Carpenter et al. |
| 9,274,076 B2 | 3/2016 | King |
| 2019/0369045 A1 | 12/2019 | Rajasekharan et al. |

\* cited by examiner

DIFFERENTIAL PROBE WITH LOW-SLOPE COMPONENT

FIELD

This application relates generally to measurement of a specific ion activity or concentration in solution based on potentiometric sensors, and, more particularly, to measurement of pH in a sample employing a low slope electrode as a component of the device.

BACKGROUND

Ensuring water quality is critical in a number of industries such as pharmaceuticals and other manufacturing fields. Additionally, ensuring water quality is critical to the health and well-being of humans, animals, and plants which are reliant on the water for survival. One parameter of the water that may be measured is pH, which indicates the water's acidic or basic character. Measurement of pH may further allow for identification or computation of other parameters of the water, for example, buffering capacity of the water, a component of the sample, or the like, which allows for identifying the overall quality of the water. One method to measure a component of the sample is to use a potentiometric measuring system.

BRIEF SUMMARY

In summary, one embodiment provides a method for measuring an analyte of a sample, comprising: introducing a sample to a sample region of a measurement device; the measurement device comprising: a measurement electrode and a ground electrode contacting the sample; a low-slope reference electrode in a reference electrode assembly having an electrolyte solution, wherein the electrolyte solution is in contact with the low-slope reference electrode; wherein the electrolyte solution is electrically coupled to the sample via at least one junction; and measuring a first potential between the measurement electrode and the ground electrode; measuring a second potential between the low-slope reference electrode and the ground electrode; determining an analyte in the sample by comparing the first potential and the second potential.

Another embodiment provides a device for measuring an analyte of a sample, comprising: a measurement electrode and a ground electrode contacting the sample; a low-slope reference electrode in a reference electrode assembly having an electrolyte solution, wherein the electrolyte solution is in contact with the low-slope reference electrode, wherein the electrolyte solution is electrically coupled to the sample via at least one junction; a processor; a memory device that stores instructions executable by the processor to: measure a first potential between the measurement electrode and the ground electrode; measure a second potential between the low-slope reference electrode and the ground electrode; determine an analyte in the sample by comparing the first potential and the second potential.

A further embodiment provides a method for measuring the pH of a sample, comprising: introducing a sample to a sample region of a measurement device; the measurement device comprising: a pH measurement electrode and a ground electrode contacting the sample; a low-slope reference electrode in a reference electrode assembly having an electrolyte solution, wherein the electrolyte solution is in contact with the low-slope reference electrode, wherein the electrolyte solution is electrically coupled to the sample via at least one salt bridge, wherein the low-slope reference electrode comprises an absolute sensitivity of less than 55 mV/pH unit; and measuring a first potential between the pH measurement electrode and the ground electrode; measuring a second potential between the low-slope reference electrode and the ground electrode; and determining a pH based on hydrogen ion concentration in the sample by comparing the first potential and the second potential.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
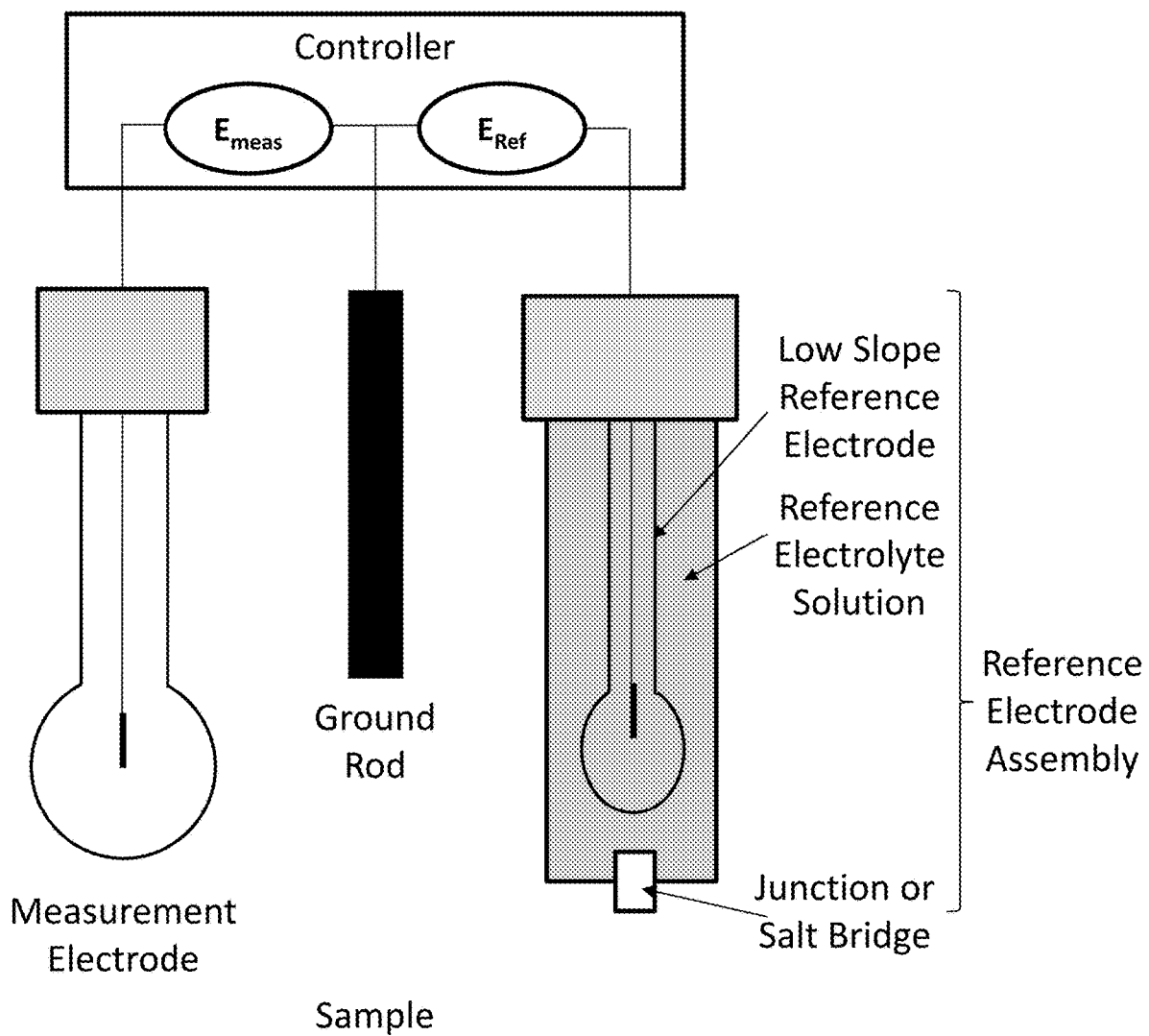
FIG. 1 illustrates a diagram of a three-electrode, differential probe configuration for measuring an analyte of a sample.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well-known structures, materials, or operations are not shown or described in detail. The following description is intended only by way of example, and simply illustrates certain example embodiments.

In some instances, for simplicity, the terms "concentration" and "activity" may be used interchangeably, as is the case for the measure of pH of a sample by means of a glass-based ion selective electrode (ISE).

A common potentiometric measurement system is a combination pH probe. Commonly, such probes consist of a glass-membrane-based hydrogen ion sensitive electrode used in series with a reference electrode. The glass membrane electrode is sensitive to changes in the hydrogen ion activity or concentration and can relate to a sample pH by the change in voltage of the electrode. The glass membrane electrode is in series with a reference electrode, such as a common Ag/AgCl reference electrode, to complete the probe measurement circuit. Ideally, the voltage of the reference electrode is defined by its composition and construction and is invariant with the change in sample. In such a case, the total voltage measured between the glass membrane pH electrode and the reference electrode is primarily a function of the voltage at the glass membrane pH electrode due to a hydrogen ion activity or concentration and the potential of the reference electrode.

Another pH measurement probe configuration is the differential pH probe. In such a device, three primary electrodes are generally utilized for the measurement of pH (for reference See U.S. Pat. Nos. 3,709,796 and 3,862,895, incorporated by reference herein). These consist of a measurement electrode, a reference electrode and a ground electrode. As in the combination electrode described above, the measurement electrode for a differential pH probe may be a glass membrane-based electrode which is sensitive to a change in the hydrogen ion activity concentration of a sample. The reference electrode may be a common reference electrode, such as an Ag/AgCl electrode, but in a differential probe is more commonly constructed of a second glass-membrane-based pH electrode which is in a solution of pH buffered electrolyte such that the buffered electrolyte solution maintains a stable potential of the reference pH electrode. The third electrode is a ground rod and may be comprise of a metal electrode, such as platinum or titanium, for instance. In a differential pH probe, the potential of the measurement electrode with respect to the ground rod is compared with the potential of the reference electrode with respect to the ground rod. The compared value is related to the sample pH.

In both the combination pH probe and the differential pH probe, the accuracy of the pH measurement of a sample depends partially upon the stability of the reference electrode potential. Changes in the reference electrode potential may result in errors in the pH measurement of a sample. One cause of error may be due to the reference potential drift caused by a change in the composition of the electrolyte contacting the reference electrode. A change in the electrolyte can cause a shift or drift in the reference electrode potential and therefore the measured value for determination of a sample pH. The degree of shift or drift may depend upon the nature and degree of change in the electrolyte solution, perhaps caused by poisoning by sample components or dilution by sample. The degree of shift or drift may also depend upon the sensitivity of the reference electrode to the changed electrolyte solution. Reference electrodes such as the Ag/AgCl type in a combination pH probe or the glass-membrane based pH electrode used as the reference electrode in a differential probe often have potential sensitivities of about 50-60 mV/decade to a component of the electrolyte: whether $Cl^-$ concentration in the example of a Ag/AgCl reference electrode or to hydrogen ion activity or concentration in the differential probe glass pH reference electrode.

The invention disclosed herein describes a method of reducing the error in a pH measurement due to the shift or drift in a reference electrode by utilizing a reference electrode that has a lower sensitivity (or slope) to the components of the reference electrolyte. Thereby, any change in the electrolyte composition, such as by dilution or poisoning, for example, will have a smaller impact on the accuracy error of the pH probe compared with the common reference electrodes since the same change in electrolyte will have a smaller absolute change to the reference electrode potential.

The measurement of a sample using a potentiometric measuring system may use metered circuitry designed to provide readings of relative voltage as sensed through measuring and reference electrodes. The system and method may calculate an ion concentration (hydrogen ion concentration in the case of pH metering). A voltage may be sensed in a circuit containing a measuring half-cell electrode and a reference half-cell electrode. The two half-cells may be electrically connected to a measuring meter or meter circuitry. For example, pH may be measured using a hydrogen ion measuring half-cell in conjunction with a reference half-cell electrode.

Conventionally, a reference electrode (for example, a Ag/AgCl electrode) may be used together with measuring electrodes to form a complete cell. The reference electrode and measuring electrode may be used to determine ion concentration in a sample. In other words, the method and system may measure pH or a concentration of an ion in the sample. The reference electrode may maintain its potential as constant as possible throughout the measurement. The measuring electrode may be such that the potential is a function of the concentration of the ion to be measured. The reference electrode's potential may be maintained by having the reference electrode in the presence of an electrolyte solution; for example, a 3M KCl/AgCl (sat'd) electrolyte solution in contact with a AgCl coated Ag wire in the case of a Ag/AgCl reference electrode. The electrolyte is commonly separated from the sample, but in electrical contact with the external sample, via a junction or salt bridge. A reference electrode in a circuit with a measuring electrode may be used to calculate the concentration of an ion in the sample. The measurement may be a voltage of the reference electrode and measurement electrode voltages and may be displayed on a millivolt (mV) instrument potentiometer. The potential of a conventional 2-electrode probe may be represented by:

$$E_{Cell} = E_{meas} - (E_{ref} + E_j)$$

where $E_{meas}$, $E_{ref}$, and $E_j$ are the potentials of the measuring electrode, the reference electrode and the junction, respectively. The reference half-cell electrode and measuring half-cell electrode are electrically connected to a pH meter circuitry to produce measurements in millivolts. The millivolt readings may represent hydrogen ion activity in the solution being measured.

A differential measurement approach utilizes a third electrode, a ground electrode. In this measurement approach, a first potential is determined between the reference electrode and the ground rod and a second potential is determined between the measurement electrode and the ground rod. For a differential pH probe, the reference electrode may be comprised of a standard glass electrode in a reference electrode assembly comprising a pH buffered electrolyte solution and a junction between the electrolyte solution and a sample. The overall measured value for determination of an analyte in a sample is the comparison of the first potential and the second potential. The potential of a differential probe may be represented by:

$$E_A = E_{MEAS} - E_{GRND}$$

$$E_B = (E_{REF} + E_j) - E_{GRND}$$

$$E_{CELL}=E_A-E_B=(E_{MEAS}-E_{GRND})-[(E_{REF}+E_j)-E_{GRND})]=E_{MEAS}-(E_{REF}+E_j)$$

Here, the reference half-cell electrode and ground rod are electrically connected to a pH meter circuitry to produce measurements in millivolts. The measurement half-cell electrode and ground rod are also electrically connected to a pH meter circuitry to produce measurements in millivolts. The millivolt readings from the two circuits may be used to produce a millivolt value to represent hydrogen ion activity in the solution being measured.

Such analyte measurement systems can suffer from potential drift that can occur, for instance, due to the change in the nature of the electrolyte solution contacting the reference half-cell electrode. A change in the potential of the reference half-cell electrode can result in a shift in the overall system potential and therefore the voltage output. This may result in an analyte measurement error. Minimizing the drift of the reference electrode over time may improve probe accuracy over a longer period which may minimize maintenance intervals and thereby save customer time, money, and frustration.

Accordingly, the systems and methods described herein provide a technique for analyte measurement in a sample. In an embodiment, a sample pH may be measured using a voltammetric electrode or a potentiometric electrode, such as an ion selective electrode (ISE). In an embodiment, the system and method may measure any analyte in the sample. In an embodiment, the system and method may use as a reference half-cell electrode, a lower sensitivity pH electrode or other ion selective electrode. A lower sensitivity electrode, referred to as a low-slope electrode, is one that has a sensitivity less than that of the measuring electrode or more often, having an absolute sensitivity to an analyte or other species that is less than ~59 mV/decade, or having an absolute sensitivity to change in a solution composition that is less than ~55 mV/decade. Such a low-slope reference electrode may replace the conventional reference electrode half-cell (i.e., one having a ~59 mV/decade slope or sensitivity) in an electrochemical based measurement system. In an embodiment, a differential pH probe using a pH electrode half-cell having a lower sensitivity or slope in the reference electrode assembly, for example, may reduce the impact of a changing or drifting pH buffer electrolyte solution composition on the reference half-cell potential compared to a pH half-cell electrode in a reference electrode assembly having a more traditional ~59 mV/pH sensitivity; thereby reducing the overall potential shift of the measurement system. For example, a pH reference electrode half-cell having a slope of about 59 mV/pH will produce a larger voltage shift for a unit change in the pH of the reference electrolyte buffer solution than will be noted for a low slope reference electrode half-cell having, for example, a sensitivity of 6 mV/pH. Therefore, for any changes or drift of the electrolyte buffer solution, a lower change in potential is observed, leading to a more accurate measurement of pH (or other analyte being measured) in the sample. This approach may provide a more stable reference system and therefore, a more accurate pH probe.

The illustrated example embodiments will be best understood by reference to the figures. The following description is intended only by way of example, and simply illustrates certain example embodiments.

Referring to FIG. 1, an embodiment may measure an analyte in a sample. In an embodiment, the system and method may measure a pH of a sample. In an embodiment, the system and method may measure an ion or analyte in a sample. The system may include three electrodes: a measuring electrode, a reference electrode, and a ground electrode (ground rod). In an embodiment, the reference electrode half-cell may be in an assembly, the assembly may have one or more junctions or salt bridges. For example, the reference electrode assembly may have a housing with a half-cell electrode inside the housing bathed in an electrolyte. The reference electrode assembly may have one or more salt bridges or junctions. There may be a junction in the housing. The junction may be for electric or ionic conductivity with a sample.

In a differential measurement system, such as that shown in FIG. 1, a first voltage or potential measurement may be made between the measurement electrode and the ground electrode. A second potential measurement may be made between the reference electrode and the ground electrode. The difference between the first potential measurement and the second potential measurement may be equivalent to the difference between the measurement electrode and the reference electrode.

In an embodiment, the system and method may improve the overall performance and longevity of a typical sensor device for measurement of an analyte or pH in a sample. For ease of readability, a glass pH electrode may be used as an exemplar. However, the system and method may relate to electrodes for measure of any analyte or ion in a sample. In other words, any ion selective electrode (ISE) may be used.

For example, a glass pH electrode may be used as a measurement electrode. The reference electrode may be a glass electrode or different material, such as a polymeric membrane-based pH ISE. The reference electrode may be internally bathed within electrolyte. The reference assembly electrolyte may be a highly conductive solution with a pH buffer. The buffer may maintain a pH of about 7.0. In an embodiment, there may be a single junction. In an embodiment there may be a double junction. The double junction may have an electrolyte solution without a pH buffer.

In a reference housing, there may be degradation or a change in the reference electrode assembly electrolyte solution over time and repeated use. This may lead to variations in the pH of the reference electrode assembly electrolyte. Such degradation or change in the reference electrode assembly electrolyte solution may lead to a drift in reference electrode potential causing less accurate or incorrect pH measurement.

In an embodiment, a reference electrode half-cell may be selected with an ionic sensitivity that is less than the sensitivity of the measurement electrode. For example, in a system with a hydronium-sensitive glass measurement electrode (~59 mV/pH), selecting a half cell reference electrode with an absolute sensitivity of less than about 55 mV/pH could be used. Thus, any changes in the electrolyte solution of the reference electrode assembly would have a smaller impact on a potential value.

In a differential probe system for pH measurement, the measurement electrode and the reference electrode may be constructed of similar hydronium ion sensing glass material. These two electrodes typically have similar hydronium ion sensitivities of ~59 mV/pH. In such a case, a pH change of one pH unit in the sample or a pH change of 1 unit in the reference electrode assembly pH buffered electrolyte solution leads to an absolute potential change of about 59 mV. In an embodiment, longevity and stability of a measurement system may be improved by using a reference electrode with a lower sensitivity. For example, a pH reference electrode with a sensitivity of ~30 mV/pH or lower may be used. In this manner, a change in measured potential may be decreased if there is a change to the pH of the reference electrode assembly electrolyte buffer solution. In other words, a shift or a drift in pH of the reference assembly electrolyte buffer solution causes a smaller change to a measured potential if a low slope electrode is used in place of the higher sensitivity electrode in the reference electrode assembly.

In an embodiment, a glass pH measurement electrode half-cell may be coupled with a calcium ISE reference electrode half-cell. A calcium ISE may have a sensitivity of ~29 mV/pCa. The sensitivity of the calcium ISE is about half that of the typical pH measurement electrode (~59 mV/pH). Therefore, any shift in the electrolyte solution in the reference assembly would cause a smaller potential shift of the probe's measurement potential. The accuracy of the measurement system may therefore be increased by making a much more stable reference electrode assembly with respect to any changes to an reference electrode electrolyte buffer solution.

In an embodiment, a reference electrode half-cell may be selected based upon the use application. Measurement of pH as an exemplar is used throughout this document for ease of readability. However, other examples of ion selective electrodes (ISE) sensitive to other analytes in the reference assembly electrolyte solution may also work for the low slope reference electrode component. For example, the following ISE's may be used:

$Ca^{2+}$ ISE in solution containing $Ca^{2+}$ ions (~29 mV/decade)

$Mg^{2+}$ ISE in solution containing $Mg^{2+}$ ions (~29 mV/decade)

$SO_4^{2-}$ ISE in solution containing $SO_4^{2-}$ ions (~29 mV/decade)

$PO_4^{3-}$ ISE ion solution containing $PO_4^{3-}$ ions (~20 mV/decade)

$Ba^{2+}$ ISE in solution containing $Ba^{2+}$ ions (~29 mV/decade)

In an embodiment, ISE's may be used that are coupled with interference ions in solution with the same result of providing a lower sensitivity. For example, a barium ISE can be in a solution of $Fe^{2+}$ (~29 mV/decade). In other words, half-cell may be selected that produces a sensitivity (mV/decade) less than the measuring electrode.

Figure 2:
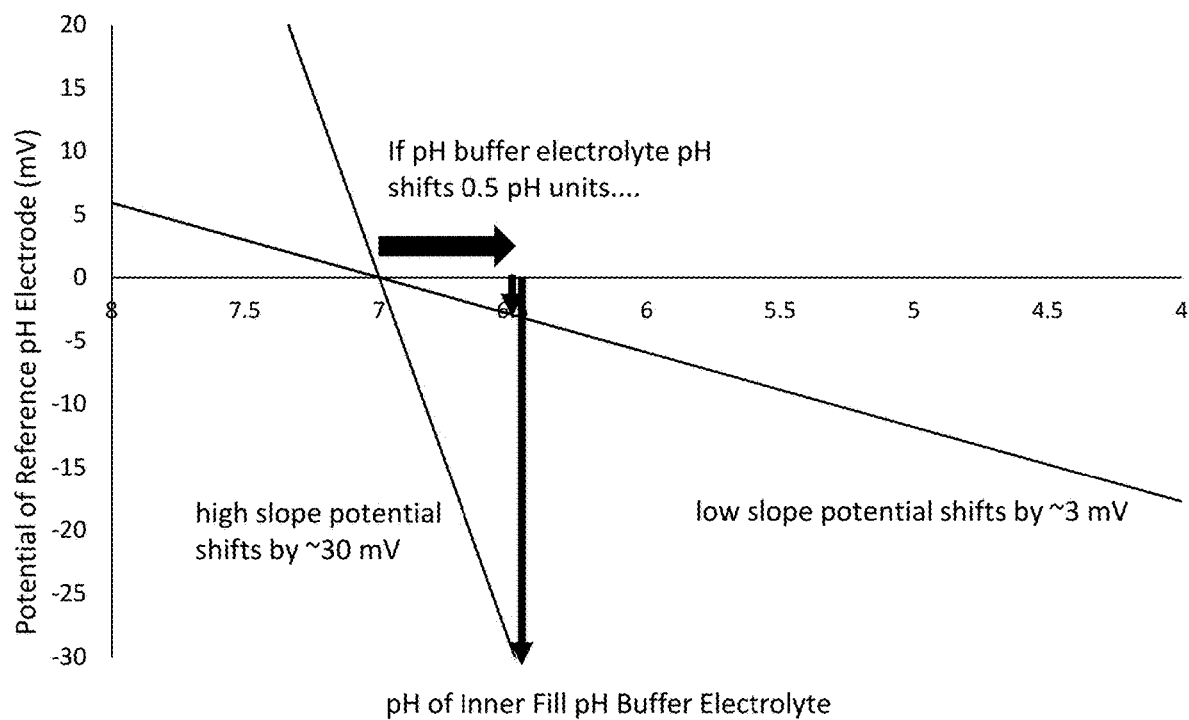
FIG. 2 illustrates example data of a low-slope electrode for measuring pH in a sample.

Referring to FIG. 2, example data of the utility of a lower slope pH reference electrode is illustrated. A low slope pH electrode may be used in place of a standard slope (~59 mV/pH) pH electrode. For example, a low slope pH reference electrode (slope of ~6 mV/pH) may shift a potential ~3 mV for a 0.5 pH shift as compared to ~30 mV for a traditional slope pH reference electrode (slope of ~59 mV/pH). The low slope pH electrode may be used as a reference electrode half-cell in a reference electrode assembly. The lower slope may decrease the degree of potential shift that occurs for a unit change in the reference electrode assembly pH buffer electrolyte used to bath the pH reference electrode. The potential of the reference electrode may be directly compared with the potential of the measuring electrode in a conventional 2-electrode ISE probe. Here, the lower change in reference potential due to change in reference electrode assembly electrolyte solution composition may allow for a more accurate measurement. In a differential arrangement (see FIG. 1), the potential of the reference pH electrode half-cell is compared with a ground rod. The reference pH electrode may be bathed in a pH buffer electrolyte with an ionic junction bridging the reference electrode assembly pH buffer electrolyte solution and the sample providing electrical circuit with the reference pH electrode and the ground rod. A measuring pH electrode may be in contact with a sample and in electrical contact with the same ground rod used in the circuit loop for the reference pH electrode. The pH of the sample may be correlated to the difference of the reference pH electrode to ground rod potential and the measuring pH electrode to ground rod potential. Here too, the lower change in reference potential due to change in reference electrode assembly pH buffer electrolyte solution composition change may allow for a more accurate measurement by the probe.

Figure 3:
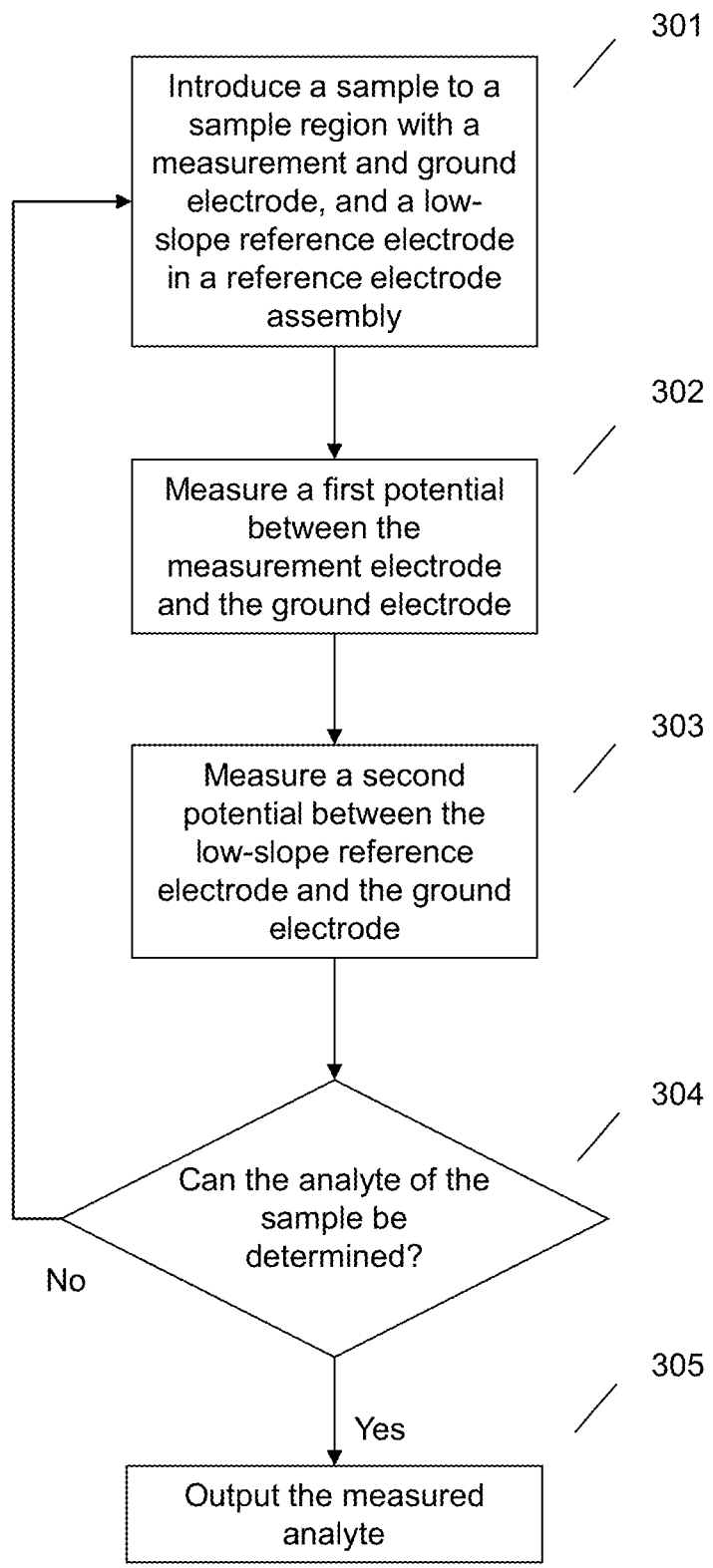
FIG. 3 illustrates flow diagram of measuring a component in an aqueous sample.

Referring to FIG. 3, an embodiment may measure an analyte of a sample. The analyte may be hydrogen ions to determine a pH. The analyte may be any ion measured by an ISE. At 301, in an embodiment, an aqueous sample may be introduced into a sample chamber or region. The aqueous sample may be placed or introduced into a test chamber manually by a user or using a mechanical means, for example, gravity flow, a pump, pressure, fluid flow, or the like. For example, a water sample for pH testing may be introduced to a chamber by a pump. In an embodiment, there may be one or more chambers in which the one or more method steps may be performed. In an embodiment, valves or the like may control the influx and efflux of the aqueous solution into or out of the one or more chambers, if present. Once the sample is introduced to the measurement system, the system may measure the pH of the sample.

In an embodiment, the electrodes may be fully or at least partially disposed in the volume of aqueous solution or sample. For example, if the aqueous solution is introduced into a chamber having one or more electrodes, the aqueous solution may at least partially cover the one or more electrodes. As another example, the one or more electrodes may be partially disposed within the chamber with the other portion of the electrode outside the chamber. Thus, when the aqueous solution is introduced into the chamber it only covers the portion of the electrodes that are within the chamber.

At 302, in an embodiment, the method and system may measure a first potential between the measurement electrode and the ground electrode. At 303, the method and system may measure a second potential between the low-slope reference electrode and the ground electrode. Further details are described herein.

The method and system, at 304, may determine an analyte or analyte concentration of the sample. This determination may be made based upon the first and the second measured potentials.

If, however, the analyte (i.e., hydrogen ions) may be determined at 304, the system, at 305, may output a pH, ionic concentration of an analyte, or the like of the aqueous sample. In an embodiment, an output may be in the form of a display, storing the data to a memory device, sending the output through a connected or wireless system, printing the output, or the like. The system may be automated, meaning the system may automatically output the electrode. The system may also have associated alarms, limits, or predetermined thresholds. For example, if a measured value reaches a threshold, the system may trigger an alarm, alert the system/personnel to a fault, alter the flow of the aqueous solution, or the like. Data may be analyzed in real-time, stored for later use, or any combination thereof.

The various embodiments described herein thus represent a technical improvement to conventional methods and instrument for measurement of an analyte. Using the techniques as described herein, an embodiment may use a method and device for an instrument for analyte measurement. This is in contrast to conventional methods with limitations mentioned above. Such techniques provide a better method to construct and an instrument for analyte measurement.

Figure 4:
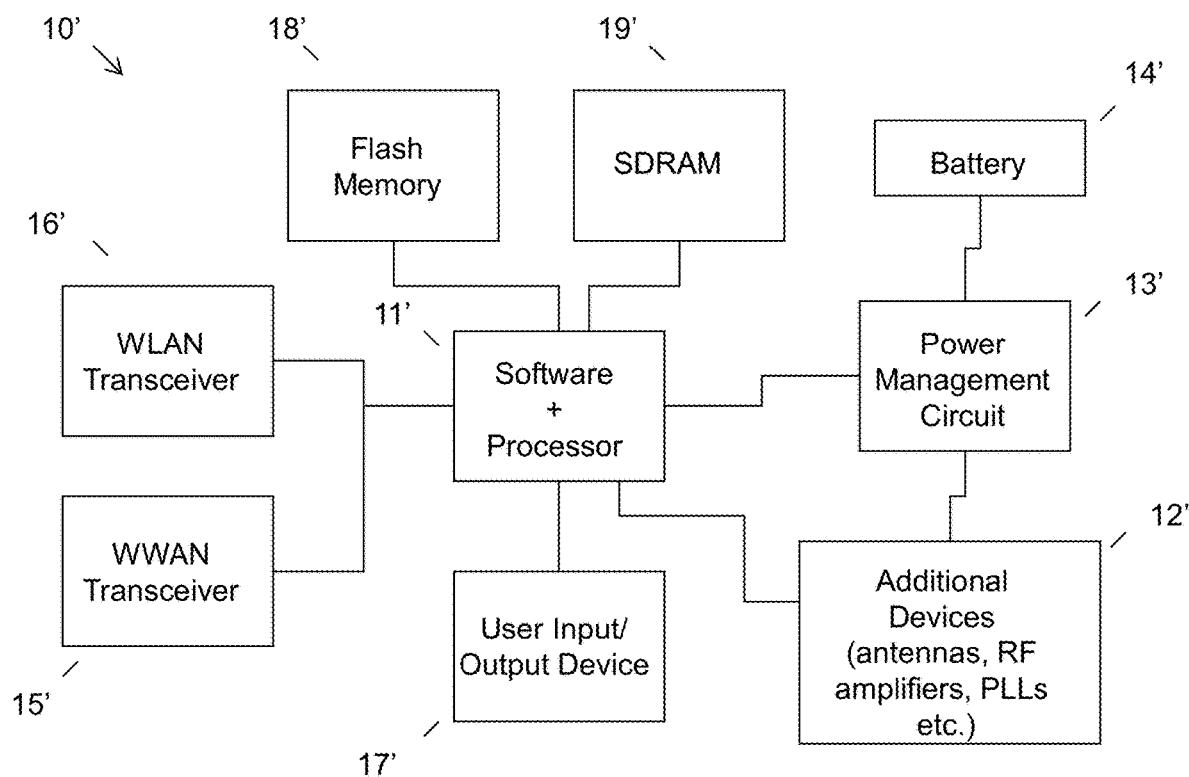
FIG. 4 illustrates an example of computer circuitry.

While various other circuits, circuitry or components may be utilized in information handling devices, with regard to an instrument for analyte measurement according to any one of the various embodiments described herein, an example is illustrated in FIG. 4. Device circuitry 10' may include a measurement system on a chip design found, for example, a particular computing platform (e.g., mobile computing, desktop computing, etc.) Software and processor(s) are combined in a single chip 11'. Processors comprise internal arithmetic units, registers, cache memory, busses, I/O ports, etc., as is well known in the art. Internal busses and the like depend on different vendors, but essentially all the peripheral devices (12') may attach to a single chip 11'. The circuitry 10' combines the processor, memory control, and I/O controller hub all into a single chip 11'. Also, systems 10' of this type do not typically use SATA or PCI or LPC. Common interfaces, for example, include SDIO and I2C.

There are power management chip(s) 13', e.g., a battery management unit, BMU, which manage power as supplied, for example, via a rechargeable battery 14', which may be recharged by a connection to a power source (not shown). In at least one design, a single chip, such as 11', is used to supply BIOS like functionality and DRAM memory.

System 10' typically includes one or more of a WWAN transceiver 15' and a WLAN transceiver 16' for connecting to various networks, such as telecommunications networks and wireless Internet devices, e.g., access points. Additionally, devices 12' are commonly included, e.g., a transmit and receive antenna, oscillators, PLLs, etc. System 10' includes input/output devices 17' for data input and display/rendering (e.g., a computing location located away from the single beam system that is easily accessible by a user). System 10' also typically includes various memory devices, for example flash memory 18' and SDRAM 19'.

It can be appreciated from the foregoing that electronic components of one or more systems or devices may include, but are not limited to, at least one processing unit, a memory, and a communication bus or communication means that couples various components including the memory to the processing unit(s). A system or device may include or have access to a variety of device readable media. System memory may include device readable storage media in the form of volatile and/or nonvolatile memory such as read only memory (ROM) and/or random access memory (RAM). By way of example, and not limitation, system memory may also include an operating system, application programs, other program modules, and program data. The disclosed system may be used in an embodiment of an instrument for analyte measurement.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device, where the instructions are executed by a processor. In the context of this document, a storage device is not a signal and "non-transitory" includes all media except signal media.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and products according to various example embodiments. It will be understood that the actions and functionality may be implemented at least in part by program instructions. These program instructions may be provided to a processor of a device, e.g., a measurement device such as illustrated in FIG. 1, or other programmable data processing device to produce a machine, such that the instructions, which execute via a processor of the device, implement the functions/acts specified.

It is noted that the values provided herein are to be construed to include equivalent values as indicated by use of the term "about." The equivalent values will be evident to those having ordinary skill in the art, but at the least include values obtained by ordinary rounding of the last significant digit.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method for measuring an analyte of a sample, comprising:
   introducing a sample to a sample region of a measurement device;
   the measurement device comprising:
      a measurement electrode and a ground electrode contacting the sample;
      a low-slope reference electrode, in a reference electrode assembly, having a sensitivity to an analyte of less than about 55 mV/decade, wherein the electrolyte solution has a first composition after the sample has been introduced, wherein the electrolyte solution is in contact with the low-slope reference electrode, wherein the electrolyte solution is electrically coupled to the sample via at least one junction wherein the low-slope reference electrode comprises an ion selective electrode for a particular ion in a solution comprising the particular ion; and measuring a first potential between the measurement electrode and the ground electrode;

measuring a second potential between the low-slope reference electrode and the ground electrode;

determining the analyte in the sample by comparing the first potential and the second potential, wherein the comparing represents a hydrogen ion activity in the sample.

2. The method of claim 1, wherein the analyte comprises a plurality of hydrogen ions.

3. The method of claim 2, wherein the plurality of hydrogen ions correlates to a pH of the sample.

4. The method of claim 1, wherein the low-slope reference electrode has an absolute sensitivity of less than 55 mV/pH unit.

5. The method of claim 1, wherein the low-slope reference electrode comprises a calcium ion selective electrode in a solution with calcium ions.

6. The method of claim 1, wherein the low-slope reference electrode comprises a magnesium ion selective electrode in a solution with magnesium ions.

7. The method of claim 1, wherein the low-slope reference electrode comprises a sulfate ion selective electrode in a solution with sulfate ions.

8. The method of claim 1, wherein the low-slope reference electrode comprises a phosphate ion selective electrode in a solution with phosphate ions.

9. The method of claim 1, wherein the low-slope reference electrode comprises a barium ion selective electrode in a solution with barium ions.

10. The method of claim 1, wherein a change in the first composition of the electrolyte solution surrounding the low-slope reference electrode causes a drift in the potential that reduces a magnitude of the change the second measured potential compared to a method using a reference electrode having a higher slope.

11. A device for measuring an analyte of a sample, comprising:

a measurement electrode and a ground electrode contacting the sample;

a low-slope reference electrode, in a reference electrode assembly, having a sensitivity to an analyte of less than about 55 mV/decade, wherein the electrolyte solution is in contact with the low-slope reference electrode, wherein the electrolyte solution is electrically coupled to the sample via at least one junction, wherein the low-slope reference electrode comprises an ion selective electrode for a particular ion in a solution comprising the particular ion;

a processor;

a memory device that stores instructions executable by the processor to:

measure a first potential between the measurement electrode and the ground electrode;

measure a second potential between the low-slope reference electrode and the ground electrode;

determine the analyte in the sample by comparing the first potential and the second potential, wherein the comparing represents a hydrogen ion activity in the sample.

12. The device of claim 11, wherein the analyte comprises a plurality of hydrogen ions.

13. The device of claim 12, wherein the plurality of hydrogen ions correlates to a pH of the sample.

14. The device of claim 11, wherein the low-slope reference electrode has an absolute sensitivity of less than 55 mV/pH unit.

15. The device of claim 11, wherein the low-slope reference electrode comprises a calcium ion selective electrode in a solution with calcium ions.

16. The device of claim 11, wherein the low-slope reference electrode comprises a magnesium ion selective electrode in a solution with magnesium ions.

17. The device of claim 11, wherein the low-slope reference electrode comprises a sulfate ion selective electrode in a solution with sulfate ions.

18. The device of claim 11, wherein the low-slope reference electrode comprises a phosphate ion selective electrode in a solution with phosphate ions.

19. The device of claim 11, wherein the low-slope reference electrode comprises a barium ion selective electrode in a solution with barium ions.

20. A method for measuring the pH of a sample, comprising:

introducing a sample to a sample region of a measurement device;

the measurement device comprising:

a pH measurement electrode and a ground electrode contacting the sample;

a low-slope reference electrode, in a reference electrode assembly, having a sensitivity to an analyte of less than about 55 mV/decade, wherein the electrolyte solution is in contact with the low-slope reference electrode, wherein the electrolyte solution is electrically coupled to the sample via at least one salt bridge, wherein the low-slope reference electrode comprises an ion selective electrode for a particular ion in a solution comprising the particular ion;

measuring a first potential between the pH measurement electrode and the ground electrode;

measuring a second potential between the low-slope reference electrode and the ground electrode; and determining a pH based on hydrogen ion concentration in the sample by comparing the first potential and the second potential.

* * * * *